United States Patent [19]

Taylor

[11] Patent Number: 4,978,451

[45] Date of Patent: Dec. 18, 1990

[54] SUPPORTED HYDROPHILIC MEMBRANE

[75] Inventor: John A. Taylor, Pinckney, Mich.

[73] Assignee: Separation Dynamics, Inc., Southfield, Mich.

[21] Appl. No.: 402,229

[22] Filed: Sep. 5, 1989

[51] Int. Cl.$^5$ .................. B01D 67/00; B01D 69/00
[52] U.S. Cl. .................. 210/500.27; 264/41; 264/451; 264/48
[58] Field of Search ............... 210/641, 500.1, 500.21, 210/500.22, 500.27, 510.1, 321.75, 506, 321.84, 500.25, 500.26; 426/425, 16; 264/41, 45.1, 48

[56] References Cited

U.S. PATENT DOCUMENTS 4,778,688 10/1988 Matson .................. 426/425
4,816,407 3/1989 Matson .................. 426/16

Primary Examiner—Frank Sever
Attorney, Agent, or Firm—Reising, Ethington, Barnard, Perry & Milton

[57] ABSTRACT

A supported composite membrane (10) includes a porous support membrane (12) forming a first layer for structurally supporting a second membrane thereon. The porous support membrane (12) includes two sides (14,16) and a plurality of pores (18) extending therethrough providing fluid communication between the two sides (14,16). A nonporous water and water soluble substance permeating membrane (20) is disposed over each of the pores (18) for selectively permeating only water and water soluble substances through each of the pores (18). A method of making the membrane (10) includes the steps of forming a porous support material (12) into a first layer, and adhering a nonporous water and water soluble substance permeating membrane (20) over each of the pores (18) for selectively permeating only water and water soluble substances through each of the pores (18).

13 Claims, 2 Drawing Sheets

U.S. Patent    Dec. 18, 1990    Sheet 1 of 2    4,978,451
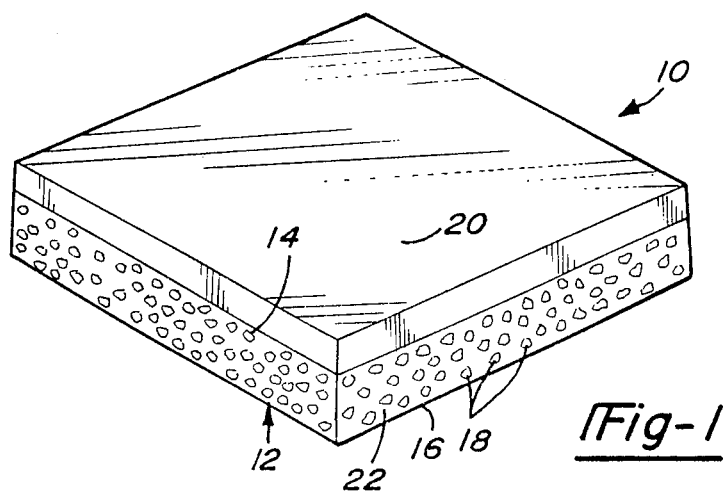
*Fig-1*
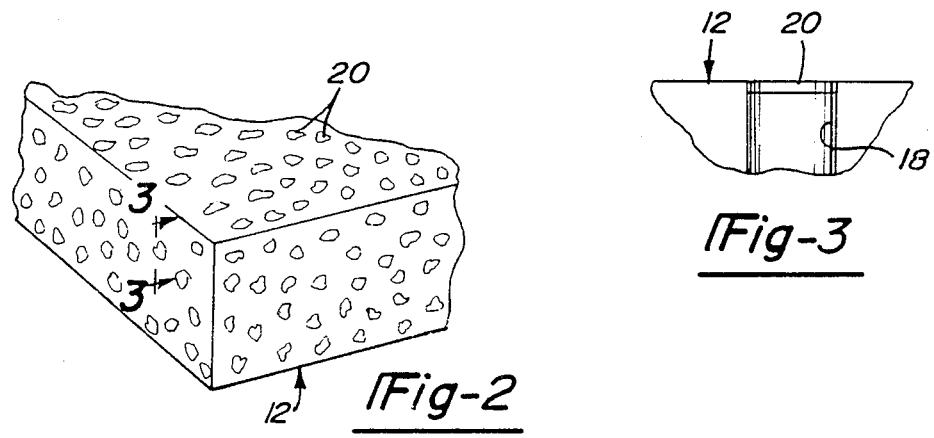
*Fig-2*    *Fig-3*
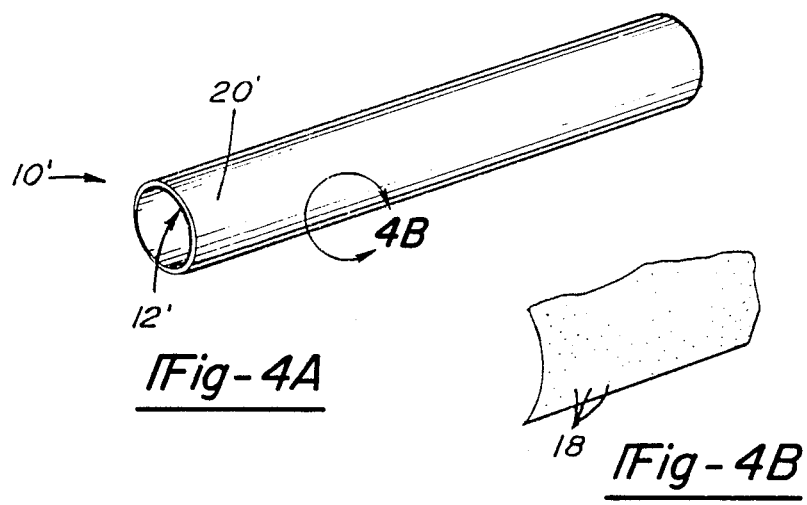
*Fig-4A*    *Fig-4B*

4,978,451

SUPPORTED HYDROPHILIC MEMBRANE

TECHNICAL FIELD

The present invention relates to membranes used for the separation of water and water soluble substances from relatively hydrophobic materials. More particularly, the present invention relates to a supported nonporous hydrophilic membrane.

BACKGROUND OF THE INVENTION

Allowed U.S. Pat. application Ser. No. 194,984, filed May 17, 1988, to the inventor, and assigned to the assignee of the present invention, describes a novel nonporous membrane material for the removal of hydrocarbons and halogenated hydrocarbons from water. The membrane is capable of removing water and water soluble substances from hydrocarbons and halogenated hydrocarbons at great efficiency. One factor limiting the efficiency of the membrane is the thickness of the membrane as the membrane functions as a diffusion barrier to the water and water soluble substances. Thickness of the diffusion barrier is directly proportional to flow efficiency therethrough.

The allowed U.S. Pat. application Ser. No. 240,632 filed Sept. 6, 1988 to the inventor and assigned to the assignee of the present invention, describes a composite membrane material that combines a nonporous hydrophilic material with a second material having selected permeability to molecules that are soluble in both the membrane materials, but not to water. an extrusion method is also disclosed for forming the composite membrane.

Several factors limit the capacity and efficiency of nonporous cuproammonium membranes. As discussed above, a critical factor is the thickness of the membrane. Balanced against decreasing thickness of the membrane is the structural stability of the membrane to remain intact as an unsupported flat membrane or hollow fiber. The above cited U.S. Pat. application Ser. No. 194,984 discloses unsupported cuproammonium cellulose hollow fibers.

The present invention includes means for providing an ultrathin nonporous membrane, such as a cuproammonium cellulose membrane, which has sufficient structural integrity while being significantly more efficient as a diffusion membrane when compared to a thicker unsupported membrane of the same type.

SUMMARY OF THE INVENTION

In accordance with the present invention, there is provided a supported composite membrane including porous support means forming a first layer for structurally supporting a membrane thereon, the porous support means including two sides and a plurality of pores extending therethrough providing fluid communication between the two sides thereof. Nonporous water and water soluble substance permeating means is disposed over each of the pores for selectively permeating only water and water substances through the pores.

The present invention further provides a method of making the supported composite membrane including the steps of forming a porous support material into a first layer, the material including two sides and a plurality of pores extending therethrough for providing fluid communication between the two sides. A nonporous water and water soluble substance permeating membrane is adhered over each of the pores for selectively permeating only water and water soluble substances through each of the pores.

FIGURES IN THE DRAWINGS

Other advantages of the present invention will be readily appreciated as the same becomes better understood by reference to the following detailed description when considered in connection with the accompanying drawings wherein:

FIG. 1 is a perspective view of a membrane made in accordance with the present invention;

FIG. 2 is a fragmentary perspective view of another membrane made in accordance with the present invention;

FIG. 3 is an enlarged fragmentary view taken substantially along lines 3—3 of FIG. 2;

FIG. 4A is a perspective view of the present invention;

FIG. 4B is a portion exploded and enlarged of the present invention;

DETAILED DESCRIPTION OF THE INVENTION

Figure 5:
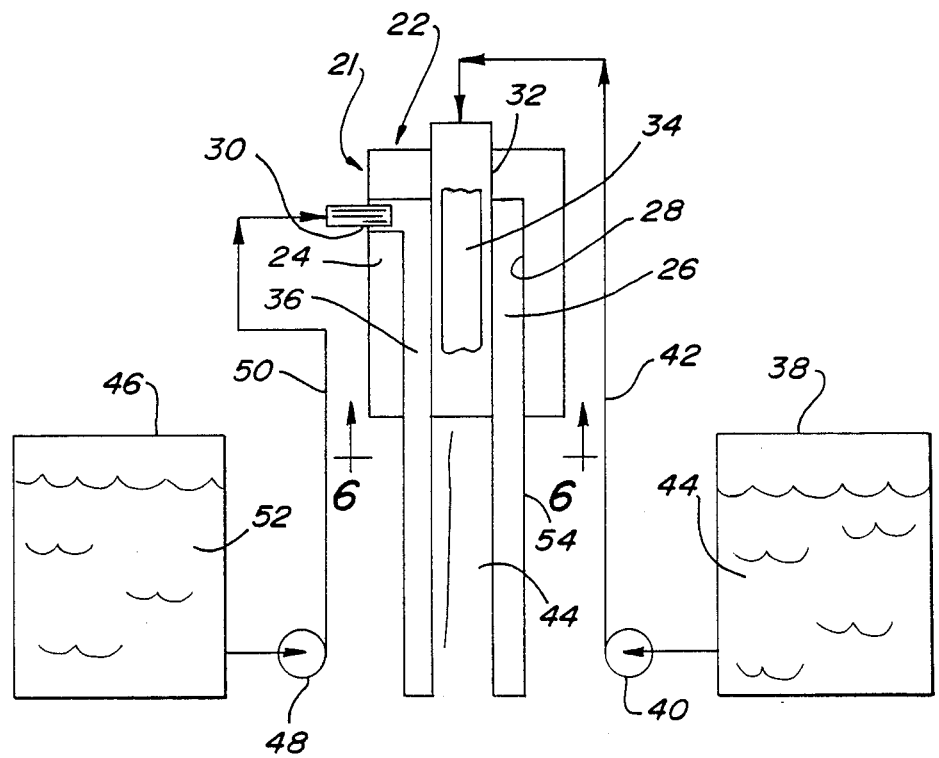
FIG. 5 is a schematic view, with certain parts shown in section, of an apparatus for making hollow fiber membranes in accordance with the present invention.

A supported composite membrane constructed and made in accordance with the present invention is generally shown at 10 in FIG. 1.

Generally, the membrane 10 includes a porous support generally indicated at 12 forming a first layer for structurally supporting a membrane thereon. The porous support 12 includes two sides 14,16 and a plurality of pores 18 extending therethrough. The pores 18 provide fluid communication between the two sides 14,16 of the porous support 12. A nonporous water and water soluble substance permeating membrane 20 is disposed over each of the pores 18 for selectively permeating only water and water soluble substances through each of the pores 18.

More specifically, the membrane shown in FIG. 1 is a flat composite membrane. The porous support 12 consists of a microporous membrane material 22 having a plurality of micropores 18 extending from one side 14 to the other side 16 thereof. Any microporous membrane material, such as polypropylene, polytetrafluoroethylene, polyvinylidene flouride, polysulfone, polyamide, or polyimide can be used, as well as microporous ceramics and also sintered metal. Each of these materials include micropores extending from one side thereof to the other side thereof. The material provides a structural support for the nonporous layer to be described below.

The nonporous water and water soluble substance permeating membrane 20 shown in FIG. 1 forms a second layer adhered to and completely covering the first layer membrane 22. The nonporous water and water soluble substance permeating membrane 20 is made from regenerated cellulosic material, such as viscous or cuproammonium regenerated cellulose. By regenerated cellulose, it is meant that the cellulose used is a regenerated cellulose in its natural state. In other words, the cellulose molecules per se are not chemically altered. Cuproammonium regenerated cellulose is nonchemically derivatized cellulose in substantially its natural state. The cuproammonium regenerated cellulose is chemically sheets of cellulose molecules. The specific ultrastructure is not known but it is known that the sheets have no pores extending therethrough. There is heavy hydrogen bonding between the sheets creating a highly crystalline structure. The structure is quite hydrophilic and provides aqueous pathways for water and dissolved water soluble materials. The water and dissolved water soluble materials diffuse through the membrane. The cuproammonium regenerated cellulose provides membranes which are significantly thinner than membranes made by chemically derivatized cellulose materials, such as cellulose acetate.

Materials diffusing through the cuproammonium cellulose membranes travel a significantly smaller distance than materials travelling through cellulose acetate membranes. Thus, the cuproammonium cellulose membranes have a significant positive effect on the flow dynamics by presenting a significantly smaller yet more effective barrier over which only the diffusing water and dissolved water soluble components pass. However, unlike prior art devices including cuproammonium cellulose fibers which are unsupported, the porous support of the present invention allows the manufacturing of a second layer of nonporous cuproammonium cellulose thereover which is significantly thinner than those prior used unsupported cuproammonium fibers. Layers as thin as one micron or less of the nonporous cuproammonium cellulose can be adhered to the porous support layer and have a sufficient structural integrity to provide a fluid separation system.

As shown in FIGS. 2 and 3, the porous support layer 12 can include pores 18 having the cuproammonium cellulose material 20 solely within the pores 18. In this manner, ultra thin layers or bubbles of cuproammonium cellulose can be adhered within the pores and function in accordance with the present invention. By making the pores smaller, the layer of cuproammonium cellulose can be made thinner to enhance and maximize the efficiency of the membrane since making the membrane thinner increases the flow rate of water and water soluble substances therethrough. The regenerated cellulose membrane, being nonporous, functions as a barrier to the passage of very small particles, including microbes, and is at the same time water permeable. Since water permeates by diffusion, the thinner regenerated cellulose membranes permit the flow of water faster than do thicker membranes of the similar type under the same conditions.

Hollow fibers can be constructed in accordance with the present invention as well as the sheet mircoporous membrane discussed above as a support for thin layers of the regenerated cellulose. FIGS. 4A and 4B show a second embodiment of the present invention wherein a microporous fiber generally indicated at 10' includes a porous support layer 12' and an outer nonporous layer 20' of cuproammonium cellulose regenerated membrane. Alternativel, the supporting microporous layer can be formed as an outer layer over a nonporous cuproammonium cellulose inner layer. Such a fiber can be used in a fiber bundle in combination with an apparatus as disclosed in allowed U.S. Pat. application No. 194,984 for fluid separation. Such a device constructed in accordance with the present invention has a much higher fluid flow rate of water diffused through the separation membranes than the prior art device.

The present invention further provides a method of making the supported membrane 10 including the steps of forming the porous support material 12 into a first layer. The material 12 includes the two sides 14,16 and a plurality of pores 18 extending therethrouqh providing fluid communication between the two sides 14,16. The nonporous water and water soluble substance permeating membrane 20 is adhered over each of the pores 18 for selectively permeating water and water soluble substances through each of the pores 18.

More specifically, the method utilizes an apparatus substantially described in U.S. Pat. Nos. 4,288,494 and 4,333,906, both to Porter et al. The inventor of the present invention a named coinventor in the aforementioned patents. The apparatus is schematically shown in FIGS. 5 and 6.

Figure 6:
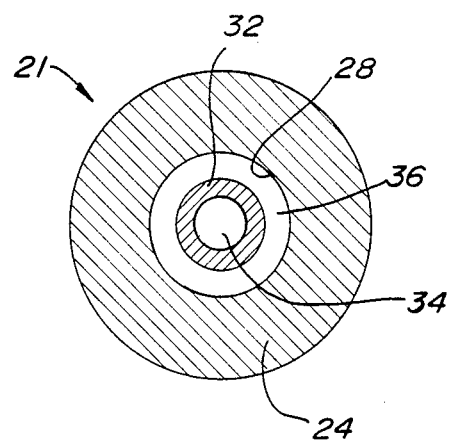
FIG. 6 is a cross sectional view taken substantially along lines 6—6 of FIG. 5.

Referring directly to FIGS. 5 and 6, the apparatus is generally indicated at 21. The apparatus 21 includes a spinneret generally indicated at 22, comprising a housing 24 having a circular chamber 26 defined by interior wall 28. One end of the chamber 26 communicates with the outer bottom of the spinneret 22. The upper end of the chamber 26 communicates with an inlet 30 in the side of the housing 24. A circular tube 32 has a lumen 34 extending the length thereof and is concentrically fixed within the chamber 26. One end of the tube 32 communicates with the outer bottom surface of the spinneret 22. The other end of the tube 32 projects somewhat beyond the top of the spinneret 22. The outer surface of the tube 32 cooperates with the interior wall 28 to define an annular space 36 through which a fiber formed material is extruded. A core fluid, either the liquid or a gas, may be passed through the lumen 34 of the tube 32.

The apparatus 21 further includes a first reservoir 38 and a pump 40. The reservoir 38 and pump 40 are connected by conduit 42 to the lumen 34 of the tube 32. The supply of core fluid 44 is held in the reservoir 38. The core fluid 44 passes from the reservoir 38 through the pump 40 into the lumen 34 of the tube 32.

The apparatus 20 further includes a second reservoir 46 and a second pump 48. The reservoir 46 and the pump 48 are connected to the inlet 30 for fluid communication through conduit 50. The reservoir 46 holds a nonporous water and water soluble substance permeating membrane forming material. Reservoir 38 containing the core fluid 44 also contains the porous support material precursor.

In operation, the nonporous water and water soluble substance permeating membrane forming material, such as the cuproammonium regenerated cellulose precursor material, is pumped by pump 48 through conduit 50 through the chamber 26 so as to be extruded as an extrudate tubular wall 54. Simultaneously, the core fluid containing the porous support membrane precursor is pumped by pump 40 through conduit 42 and into the lumen 34. The wall 54 of the nonporous membrane forming material 52 surrounds the core fluid 44. The extrudate, after solidification and regeneration, has the structure shown in FIG. 3. If the core fluid is gas, then it need not be removed from the interior of the fiber. If the core fluid is a liquid, such liquid can be removed after the desired fiber has been formed. The apparatus 20 can therefore be used to form a first layer of porous support material and a second layer adhered thereto of nonporous water and water soluble substance permeating membrane. In other words, the nonporous membrane is extruded over the formed porous support material. The fluid containing the porous support material precursor forms the hollow core of the fiber 10' and deposits the selected fiber forming precursor on the interior of the second layer of nonporous membrane.

The core fluid can act as both a solvent for the chemical reaction or the deposition of the fibrous membrane support that adheres to the inner surface of the extruded hollow fiber nonporous membrane. The addition of reactive chemicals to the core fluid can serve as further means to create new composite materials with special properties. A wide range of membrane properties can be derived by the combination of the desired polymeric support membrane with the basic cuproammonium cellulose material.

In using the membrane constructed in accordance with the present invention, the porous support material can be a hydrophilic or hydrophobic membrane material. If the membrane is inherently hydrophobic, the support membrane can be hydrophilized with surfactant, such as Triton X. Alternatively, the pores of the hydrophobic membrane can be wetted by the treatment of an alcohol flushed through the pores. Once the alcohol is contained within the pores of the support membrane, the alcohol is flushed out with water so that water remains in the pores. The membrane can then be used effectively as a hydrophilic sieve allowing water and water soluble materials to pass through but not hydrophilic and particulate matter. The term sieve is here meant to describe the nonporous membrane which selectively allows diffusion therethrough as opposed to selected filtration through pores, as a function similar to a cellulose acetate membrane. That is, the pores of the porous support membrane 12 do not act as a filter but rather as a support for the nonporous water and water soluble substance permeating membrane 20.

EXAMPLE I

A microporous polypropylene hollow fiber having an average port size of 0.2 microns was coated on its outside surface with a solution of 8.5% cuproammonium cellulose solution coagulated and regenerated according to the procedure described in U.S. Pat. Nos. 4,288,494 and 4,333,906, both to Porter et al.

The resultant composite hollow fiber contains a 20 micron layer of regenerated cellulose nonporous membrane layer under which was the polypropylene microporous hollow fiber base membrane.

A module containing 0.06 sq. meters of surface area was made from the composite hollow fiber membrane and tests of water permeability were carried out.

Results
TABLE I

| Pressure | Water Flux Rate (ml/min) |
| --- | --- |
| 40 | 13.4 |
| 50 | 24.4 |
| 60 | 28.8 |
| 70 | 33.6 |
| 80 | 37.6 |
| 90 | 42.8 |

These results show a water flux rate of 5.6 ml/minute/m$^2$/psi. for a 20 micron single layer of cuproammonium regenerated cellulose when tested as a single membrane. CRC water flux was measured to be 5.3 ml/minute/m$^2$/psi. This data shows that within experimental error, when nonporous, hydrophilic regenerated cellulose membrane is made into a composite with 0.2 micron average pore size microporous polypropylene membrane as a support surface, no water reduction in flux was observed.

These data also show that the basement microporous membrane does not retard water flux rate of the composite structure, and that therefore extremely thin layers of cuproammonium regenerated cellulose membrane may be achieved.

EXAMPLE II

A microporous membrane sheet made from polyvinylidene fluoride (PVDF) with an average pore size of 0.54 microns was coated with a 2.5% solution of cuproammonium cellulose prepared according to the methods referred to in Example 1.

The cuproammonium regenerated cellulose membrane was formed on top of the PVDF membrane by first coagulating the CRC solution with 10% sodium hydroxide, treatement with 2.0% sulfuric acid, washing with water and drying. The resultant CRC membrane film fixed to the PVDF base membrane had a thickness of 0.5 microns. A disc 5.5 cm. in diameter (0.022 sq meters) of the PVDF/CRC composite membrane was cut and placed in test cell designed for the measurement of water flux of sheet membranes. Transmembrane pressure used in the test ws 50 mm/Hg.

Results

Water flux at 50 mm/Hg was 3.35 ml/min Ho flux for the 0.022 mm test disc of composite PVDF/CRC membrane.

Conversion of these date to water flux per sq. meter of membrane indicate that this composite PVDF/CRC having a CRC thickness of 0.5 microns had a flux rate of 152.3 ml/min/psi/m$^2$.

Leak tests by applicaton of air pressure were performed on the dry membrane before water flux measurements were carried out. No leaking was detected and the cell held 20 psi of air pressure. Microporous PVDF membrane alone will not hold air pressure when dry.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A supported membrane for separating water from a water and hydrocarbon and/or halogenated hydrocarbon mixture, said membrane comprising porous support means (12) forming a first layer for structurally supporting said membrane thereon, said porous support means (12) including two sides (14,16) and a plurality of pores (18) extending therethrough providing fluid communication between said two sides (14,16); and characterized by a nonporous water and water soluble substance permeating membrane (20) supported by said porous support means over each of said pores (18) for selectively permeating only water and water soluble substances through each of said pores (18) from the mixture and enabling a thinner layer of said nonporous membrane over each of said pores and supported sufficient to withstand increased pressures resulting in improved efficiencies of water flow across said membrane.

2. A membrane as set forth in claim 1 further characterized by said nonporous water and water soluble substance permeating means (20) forming a second layer adhered to and completely covering said first layer.

3. A membrane as set forth in claim 1 further characterized by said nonporous water and water soluble substance permeating means (20) comprising cuproammonium regenerated cellulose.

4. A membrane as set forth in claim 1 further characterized by said porous support means (12) consisting of a microporous material (22).

5. A membrane as set forth in claim 4 further characterized by said microporous membrane material being selected from the group consisting of polypropylene, polyvinylidene flouride, polytetraflouro ethylene, polysulfone, polyamide, polyimide, microporous ceramics, and sintered metals.

6. A method comprising making a supported membrane (10) having properties for separating water from water and hydrocarbon and/or halogenated hydrocarbon mixtures by forming a porous support material (12) into a first layer, the first layer including two sides (14,16) and a plurality of pores (18) extending therethrough providing fluid communication between the two sides (14,16) and adhering a nonporous water and water soluble substance permeating membrane (20) to said porous support material enabling a thinner layer of said nonporous membrane to withstand increased pressures resulting in improved efficiencies of water flow across said membrane.

7. A method as set forth in claim 6 wherein said adhering step is further defined as adhering a second layer of the nonporous water and water soluble substance permeating membrane (20) over the first layer.

8. A method as set forth in claim 7 wherein said forming step is further defined as extruding a nonporous water and water soluble substance permeating membrane forming material having a hollow core and converting the material to the membrane form (20), said adhering step being further defined as supplying an inert fluid containing precursor of the porous support material (12) to the hollow core, the precursor forming the porous support material (12) while the nonporous water and water soluble substance permeating membrane (20) physically adheres to the pores (18) of the formed porous support material (12).

9. A method as set forth in claim 8 wherein said extruding step is further defined as extruding the membrane forming material about the fluid containing the precursor of the porous support material (12), the fluid forming the hollow core of a fiber formed thereby and depositing the porous support material on the inner surface of the formed membrane.

10. A method as set forth in claim 9 wherein said forming step is further defined as supplying the precursor material to a chamber (26) communicating with an outer surface thereof, and extruding the precursor material as a hollow core extrudate (54) through an annular space (36) between the chamber (26) and an outer space of a tube (32) having a continuous lumen extending the entire length thereof secured within the chamber (26).

11. A method as set forth in claim 10 wherein said supplying step is further defined as supplying the inert fluid (44) containing the precursor material to the lumen (34) and exiting the extrudate (54) with the fluid (44) contained in the hollow core thereof simultaneously from the annular space (36) and lumen (34) respectively.

12. A method as set forth in claim 11 wherein said first layer is an inner layer and said second layer is an outer layer.

13. A method as set forth in claim 11 herein said first layer is an outer layer and said second layer is an inner layer.

* * * * *